US011194533B2

(12) United States Patent
Yamaguchi et al.

(10) Patent No.: US 11,194,533 B2
(45) Date of Patent: Dec. 7, 2021

(54) INFORMATION PROCESSING SYSTEM AND NON-TRANSITORY COMPUTER READABLE MEDIUM FOR MANAGING TIME SLOTS REGARDING PRINTING TO A ROLL OF PAPER

(71) Applicant: FUJIFILM BUSINESS INNOVATION CORP., Tokyo (JP)

(72) Inventors: Megumi Yamaguchi, Kanagawa (JP); Takashi Kikumoto, Kanagawa (JP); Shingo Tajima, Kanagawa (JP); Bo Liu, Kanagawa (JP); Masatake Kawabe, Kanagawa (JP); Daisuke Noguchi, Kanagawa (JP); Shogo Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/746,287

(22) Filed: Jan. 17, 2020

(65) Prior Publication Data
US 2021/0064301 A1 Mar. 4, 2021

(30) Foreign Application Priority Data
Sep. 4, 2019 (JP) .............................. JP2019-161566

(51) Int. Cl.
*G06F 3/12* (2006.01)
(52) U.S. Cl.
CPC ............ *G06F 3/126* (2013.01); *G06F 3/1207* (2013.01); *G06F 3/1235* (2013.01); *G06F 3/1259* (2013.01)

(58) Field of Classification Search
None
See application file for complete search history.

(56) References Cited

U.S. PATENT DOCUMENTS

| | | | |
|---|---|---|---|
| 8,320,787 B2* | 11/2012 | Hosoi | G03G 21/206 399/81 |
| 8,725,022 B2* | 5/2014 | Kamata | G03G 15/6508 399/81 |
| 8,937,740 B2* | 1/2015 | Sakata | B41J 13/103 358/1.15 |
| 9,036,191 B2* | 5/2015 | Kikumoto | G06K 15/005 358/1.15 |
| 2007/0013959 A1* | 1/2007 | Miwa | B41J 11/663 358/304 |
| 2010/0034550 A1* | 2/2010 | Arai | G03G 15/5016 399/81 |
| 2011/0013924 A1* | 1/2011 | Hosoi | G03G 15/6508 399/83 |

(Continued)

FOREIGN PATENT DOCUMENTS

| | | |
|---|---|---|
| JP | 2013-171073 A | 9/2013 |
| JP | 2015-001850 A | 1/2015 |

(Continued)

*Primary Examiner* — Henok Shiferaw
(74) *Attorney, Agent, or Firm* — Oliff PLC

(57) ABSTRACT

An information processing system includes a processor that manages time slots in which a roll paper has been consumed for printing or time slots in which the roll paper is scheduled to be consumed for printing and controls output of a first image in which figures corresponding to the time slots are arranged for an attribute of the paper along a time axis.

7 Claims, 16 Drawing Sheets

(56) References Cited

U.S. PATENT DOCUMENTS

| | | | |
|---|---|---|---|
| 2011/0051187 A1* | 3/2011 | Konuma | H04N 1/00477 358/1.15 |
| 2011/0224816 A1* | 9/2011 | Pereira | G05B 19/41865 700/100 |
| 2012/0062919 A1* | 3/2012 | Hashimoto | G06F 3/1207 358/1.12 |
| 2012/0311586 A1* | 12/2012 | Inagaki | G06F 9/4881 718/100 |
| 2014/0208335 A1* | 7/2014 | Endrikhovski | G06F 11/324 719/318 |
| 2014/0368866 A1* | 12/2014 | Kikumoto | G06F 3/1259 358/1.15 |
| 2015/0103364 A1* | 4/2015 | Abe | H04N 1/00411 358/1.13 |
| 2019/0050181 A1* | 2/2019 | Van Vliembergen | G06F 3/121 |

FOREIGN PATENT DOCUMENTS

| | | | |
|---|---|---|---|
| JP | 6065758 B2 | 1/2017 | |
| JP | 6399179 B2 | 10/2018 | |

* cited by examiner

FIG. 7

(A) BEFORE CHANGE: SCHEDULED END TIME OF PRINT JOB #25: 19:00

30 MINUTES SHORTENED (B) AFTER CHANGE: SCHEDULED END TIME OF PRINT JOB #25: 18:30

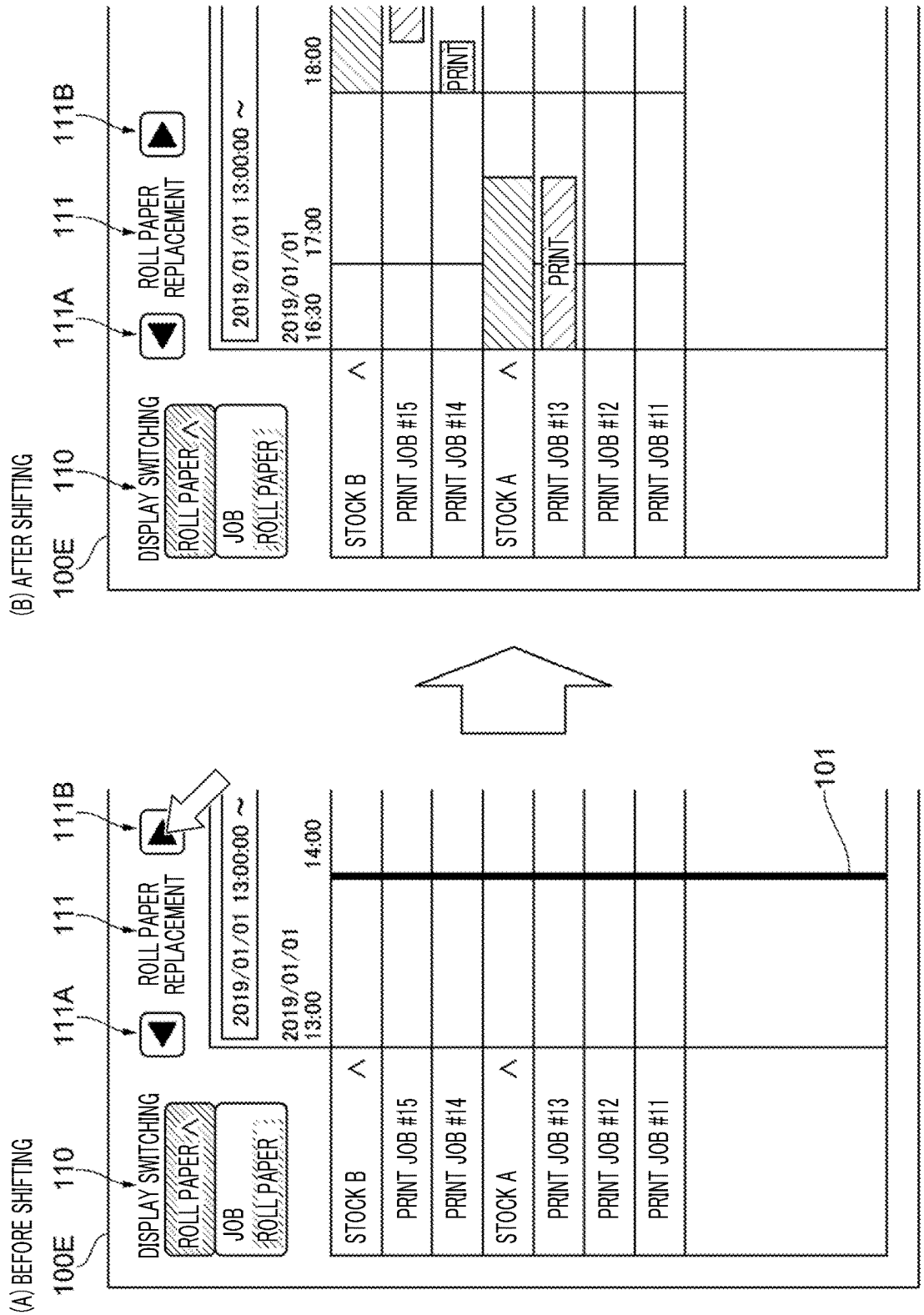

INFORMATION PROCESSING SYSTEM AND NON-TRANSITORY COMPUTER READABLE MEDIUM FOR MANAGING TIME SLOTS REGARDING PRINTING TO A ROLL OF PAPER

CROSS-REFERENCE TO RELATED APPLICATIONS

This application is based on and claims priority under 35 USC 119 from Japanese Patent Application No. 2019-161566 filed Sep. 4, 2019.

BACKGROUND

(i) Technical Field

The present disclosure relates to an information processing system and a non-transitory computer readable medium.

(ii) Related Art

A certain image forming apparatus has the function of displaying the positions and lengths of bar-shaped figures arranged along a time axis to show time slots corresponding to individual print jobs that have been executed or are scheduled to be executed. This display is called timeline display (for example, see JP-A-2015-001850).

When managed, print jobs may be assigned to a roll paper. It should be noted that it takes time to replace a roll paper. To increase the efficiency of printing and processing, therefore, it is necessary to start operation at right timing with when to replace the roll paper. In the display for each print job, however, the print job end time does not necessarily match the timing for replacing the roll paper.

SUMMARY

Aspects of non-limiting embodiments of the present disclosure relate to enabling checking of the history or schedule for each roll paper, unlike the timeline display for each print job.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor that manages time slots in which a roll paper has been consumed for printing or time slots in which the roll paper is scheduled to be consumed for printing and controls output of a first image in which figures corresponding to the time slots are arranged for an attribute of the paper along a time axis.

BRIEF DESCRIPTION OF THE DRAWINGS

Exemplary embodiments of the present invention will be described in detail based on the following figures, wherein:

FIG. 7 is a diagram for explaining the contents of events reflected in the timeline;

FIG. 16 is a diagram for explaining a change in display when shifting to the next replacement time is instructed on the management screen.

DETAILED DESCRIPTION

Hereinafter, an exemplary embodiment of the present disclosure will be described with reference to the drawings.

Exemplary Embodiment 1

System Configuration

Figure 1:
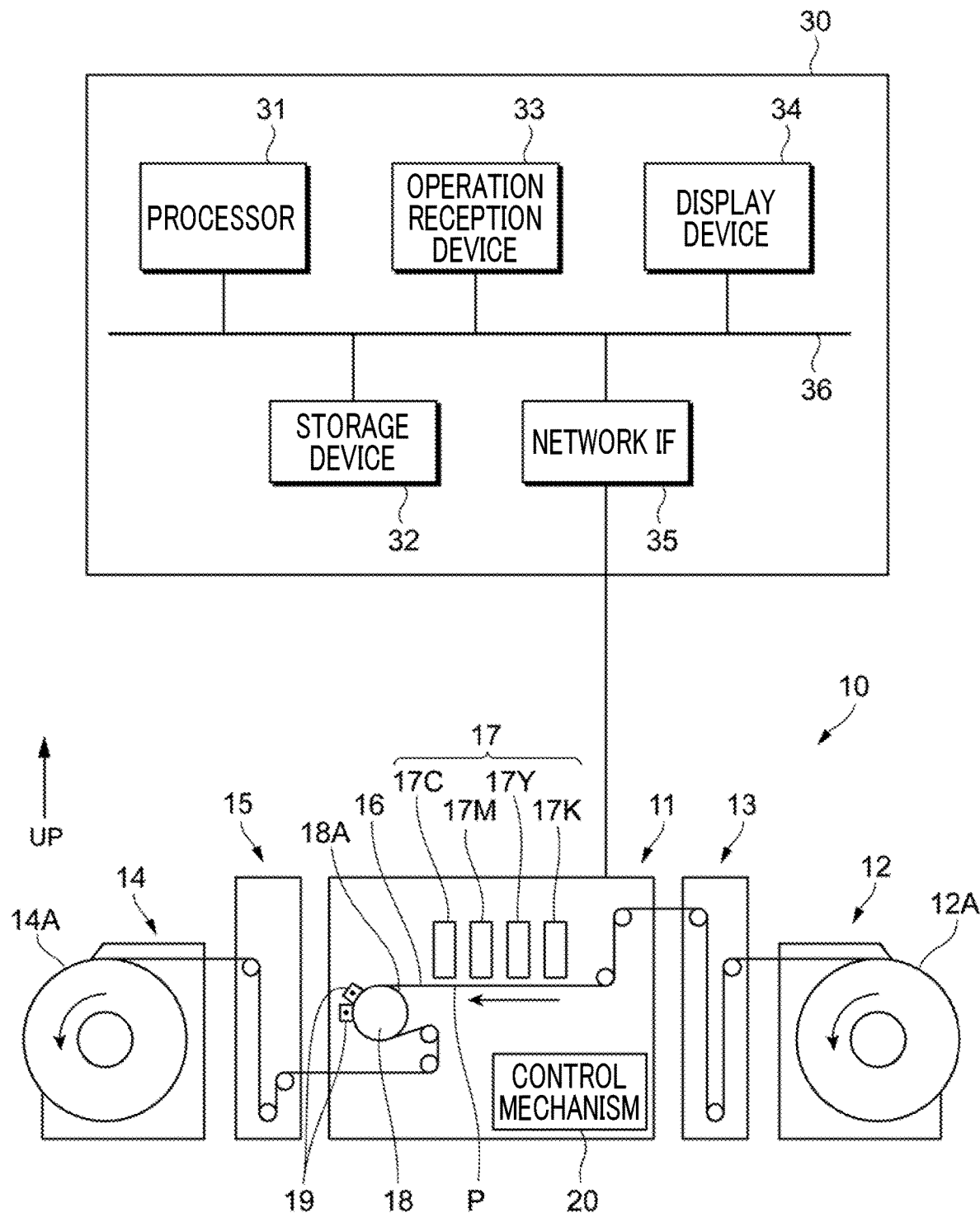
FIG. 1 is a diagram schematically showing an example of the overall configuration of an image forming system used in Exemplary Embodiment 1.

FIG. 1 is a diagram schematically showing an example of the overall configuration of an image forming system 1 used in Exemplary Embodiment 1.

The image forming system 1 shown in FIG. 1 includes an image forming apparatus 10 that forms an image on a roll paper and a management server 30 that controls image formation by the image forming apparatus 10. The term "roll paper" refers to a roll of long continuous belt-shaped paper P wound around a reel (hereinafter also referred to as "continuous paper P"). In the case of FIG. 1, an example is shown in which the number of image forming apparatuses 10 managed by the management server 30 is one, but plural image forming apparatuses 10 may be managed. The management server 30 according to the present exemplary embodiment has a function of displaying a past printing history and a future printing schedule in the image forming apparatus 10 to be managed on a timeline. Here, the management server 30 is an example of an information processing system.

Configuration of Image Forming Apparatus

The image forming apparatus 10 shown in FIG. 1 includes an image forming unit 11 that forms an image on a continuous paper P, a preprocessing unit 12 that stores the continuous paper P supplied to the image forming unit 11, a buffer unit 13 that is disposed between the image forming unit 11 and the preprocessing unit 12 and adjusts the transport amount of the continuous paper P supplied from the preprocessing unit 12 to the image forming unit 11, a postprocessing unit 14 that stores the continuous paper P output from the image forming unit 11, and a buffer unit 15 that is disposed between the image forming unit 11 and the postprocessing unit 14 and adjusts the transport amount of the continuous paper P output from the image forming unit 11 to the postprocessing unit 14.

The image forming unit 11 includes a roll member that guides the continuous paper P along a transporting path 16 and a liquid discharge device 17 that forms an image by discharging liquid on the continuous paper P transported along the transporting path 16. In this exemplary embodiment, a so-called inkjet method is adopted as a printing method.

The liquid discharge device 17 has a liquid discharge head 17K that discharges ink droplets on the continuous paper P to form a black image, a liquid discharge head 17Y for forming a yellow image, a liquid discharge head 17M for forming a magenta image, and a liquid discharge head 17C for forming a cyan image. The liquid discharge head 17K, the liquid discharge head 17Y, the liquid discharge head 17M, and the liquid discharge head 17C are arranged in this order from the upstream side to the downstream side in the transport direction. Of course, the liquid discharge head 17K, the liquid discharge head 17Y, the liquid discharge head 17M, and the liquid discharge head 17C are arranged at positions facing the continuous paper P to be transported.

In the following description, when K, Y, M, and C are not distinguished, the reference symbols K, Y, M, and C are omitted.

A drying drum 18 is disposed on the downstream side of the liquid discharge head 17C in the paper transport direction. The back surface of the continuous paper P is wound around an outer peripheral surface 18A of the drying drum 18, and the image formed on the continuous paper P is dried while the drying drum 18 is rotated in contact with the transported continuous paper P.

In addition, a halogen heater 19 that dries the image formed on the continuous paper P is disposed around the drying drum 18. The image of the continuous paper P wound around the drying drum 18 is dried by the halogen heater 19.

The image forming unit 11 is provided with a control mechanism 20 that controls each member. The control mechanism 20 includes a central processing unit (=CPU), a read only memory (ROM), a random access memory (=RAM), a hard disk device, and other storage devices (not shown).

The preprocessing unit 12 includes a supply roll 12A around which the continuous paper P supplied to the image forming unit 11 is wound. The supply roll 12A is rotatably supported by a frame member (not shown).

On the other hand, the postprocessing unit 14 includes a winding roll 14A as an example of a transport unit that winds the continuous paper P on which images are formed. The winding roll 14A is rotationally driven by a motor (not shown). Due to the rotation of the winding roll 14A, the continuous paper P is pulled out from the supply roll 12A and transported along the transporting path 16. Here, the transporting speed of the continuous paper P is controlled by the control mechanism 20. Specifically, the control mechanism 20 controls the rotation speed of a motor (not shown) that rotationally drives the winding roll 14A.

In the case of the present exemplary embodiment, the control of the transporting speed of the continuous paper P by the control mechanism 20 is executed based on an instruction from the management server 30.

Configuration of Management Server

The management server 30 includes a processor 31 that controls the operation of the entire server and the image forming apparatus 10 through execution of a program, a storage device 32 that stores the program executed by the processor 31 and various data, an operation reception device 33 that receives operation of an user, a display device 34 that displays an operation screen to be checked by the user, and a network interface (=IF) 35 that realizes communication with the image forming apparatus 10. These units are connected by signal lines 36 such as a data bus, an address bus, and a peripheral component interconnect (PCI) bus.

The processor 31 is composed of a CPU, for example. The storage device 32 includes a ROM that stores, for example, a basic input output system (=BIOS), a RAM that is used as a work area, and a hard disk device that stores basic programs, application programs, and the like. Of course, the processor 31 may include the ROM and RAM. The processor 31 and the storage device 32 constitute a computer.

The operation reception device 33 is composed of, for example, a keyboard, a mouse, mechanical buttons, and switches. The operation reception device 33 includes a touch sensor that constitutes a touch panel integrally with the display device 34.

The display device 34 includes a liquid crystal display or an organic electro luminescence (=EL) display used for displaying information. On the operation screen displayed on the display device 34, it is possible to select a job to be printed and check whether the job is being printed or held. The display device 34 displays a timeline.

Timeline Display Example

Figure 2:
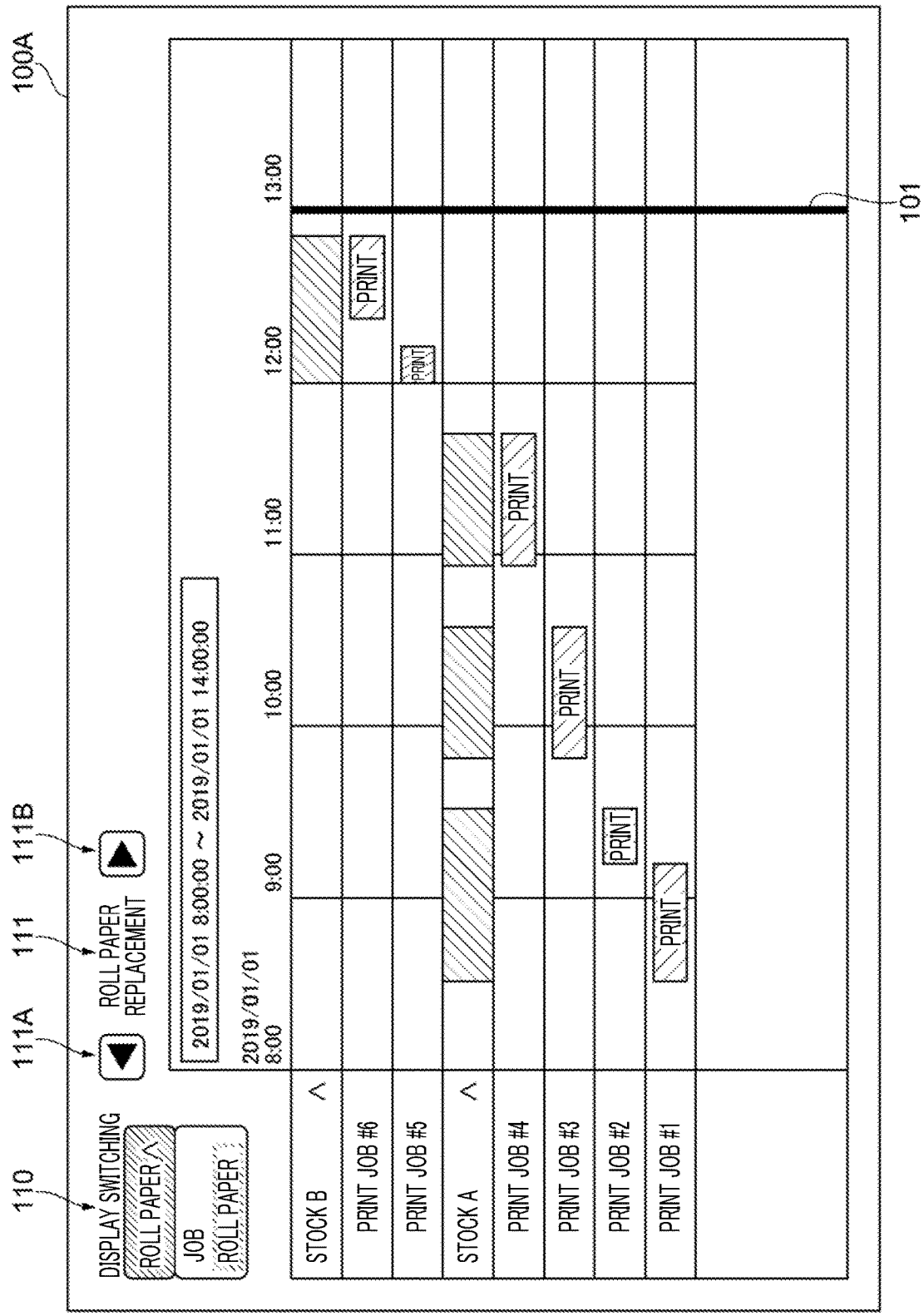
FIG. 2 is a diagram showing a display example of the timeline generated and displayed by a management server used in Exemplary Embodiment 1.

FIG. 2 is a diagram showing a display example of the timeline generated and displayed by the management server 30 used in Exemplary Embodiment 1.

On a screen for management (hereinafter referred to as "management screen") 100A shown in FIG. 2, the timeline of the print job is displayed for each roll paper. A bold line 101 shown at 13:00 represents the current time. The time slot before the bold line 101 indicating the current time (that is, 8:00 to 13:00) represents the history of a print job that has already been executed, whereas the time slot after the bold line 101 indicating the current time (that is, 13:00 to 14:00) represents a print job schedule.

In the case of FIG. 2, a switching button 110 used for switching between display for each print job and display for each roll paper is disposed in the upper left corner of the management screen 100A. In the case of FIG. 2, the display for each roll paper is selected. For this reason, the background of the roll paper is displayed darker. In FIG. 2, the switching button 110 is indicated by "display switching".

In addition, a shift button 111 for switching the displayed time slot for each roll paper replacement time is disposed in the upper part of the management screen 100A. In the case of FIG. 2, it is indicated by an indication "roll paper replacement". The shift button 111A is used for shifting to the previous replacement time with respect to the display position, and the shift button 111B is used for shifting to the next replacement time with respect to the display position.

In the present exemplary embodiment, "stock" defined by the attributes of the roll paper to which the print job is assigned is used for displaying the timeline. The reason why the stock is used for displaying the timeline is that the roll paper is a consumable, and it is difficult to manage the roll paper with a management number or the like. In the case of the present exemplary embodiment, the stock is defined by, for example, paper size, paper type, paper color, paper basis weight, paper thickness, coat type, and punch holes.

FIG. 2 illustrates a management screen 100A, which indicates the relationship between the print job and roll paper in terms of the relationship between the print job and stock. On the management screen 100A, stock A and stock B are displayed. The stock A is associated with print job #1, print job #2, print job #3, and print job #4. The stock B is associated with print job #5 and print job #6.

Stock is information indicating the attribute of the roll paper, and plural roll papers with the same attribute may be associated with one stock. In other words, n roll papers may be associated with one stock. In this case, the relationship between stock and roll paper may be represented by 1:n.

In the case of timeline display, the time slot spent for printing on each job is represented by a bar-shaped figure arranged along the time axis on the same row as that for the corresponding job name. Further, the time slots in which each roll paper has been consumed for printing are represented by bar-shaped figures arranged along the time axis in the same row as that for the corresponding stock.

The display of the management screen 100A shown in FIG. 2 makes it easy to monitor not only the time slot in which each print job has been executed but also the time slot in which each stock is consumed for printing. In other words, it becomes easy to monitor the time slots corresponding to the times of printing (hereinafter referred to as "printing times") including one or more print jobs executed continuously using the same roll paper. In addition, it becomes easy to monitor the relationship between each print job and each stock. The display of the row associated with each job name is an example of the second image.

Figure 3:
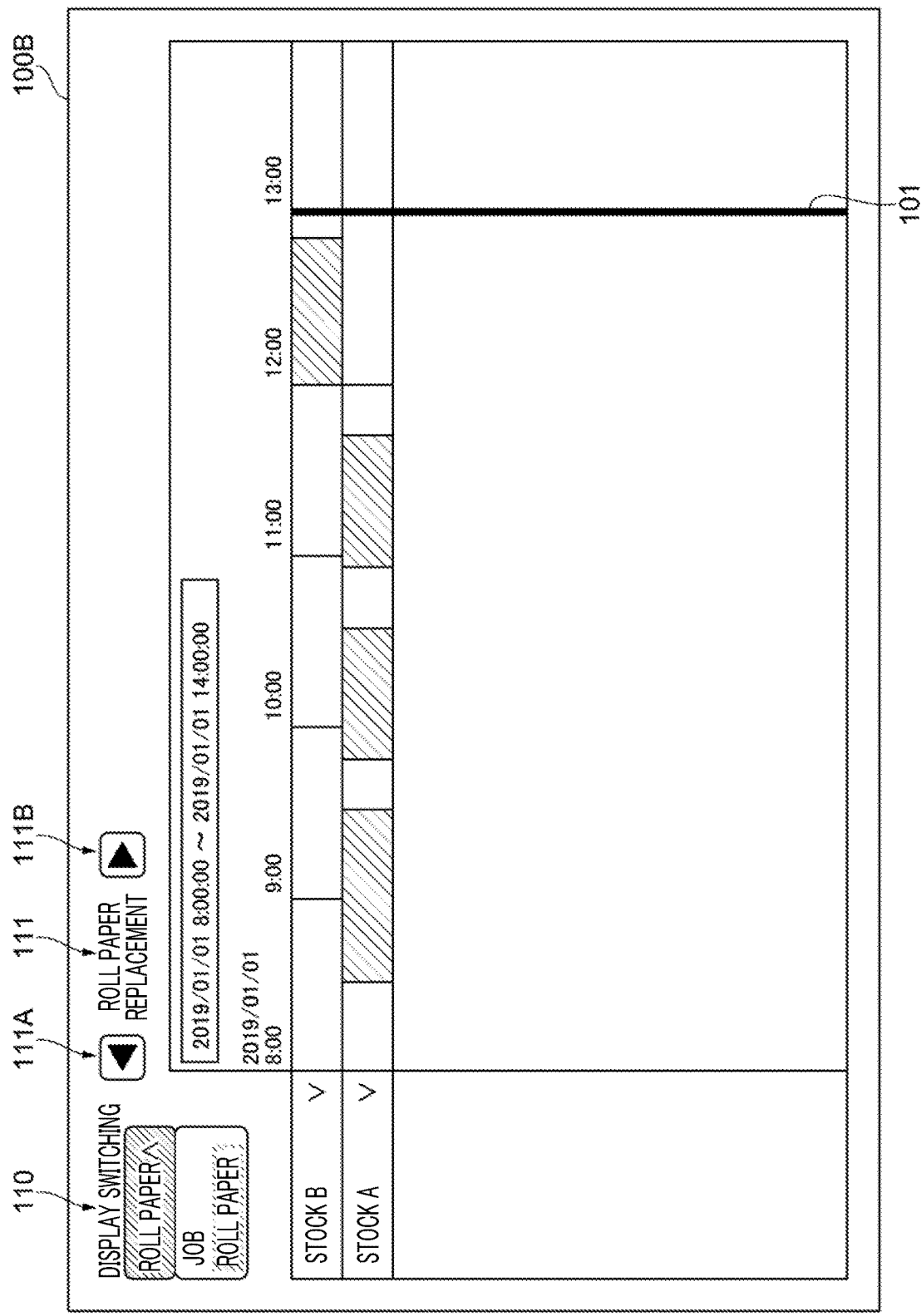
FIG. 3 is a diagram showing another display example of the timeline generated and displayed by the management server used in Exemplary Embodiment 1.

FIG. 3 is a diagram showing another display example of the timeline generated and displayed by the management server 30 used in Exemplary Embodiment 1. In FIG. 3, reference symbols are given corresponding to those in FIG. 2.

The management screen 100B shown in FIG. 3 represents a state in which the display of the print job is closed. The management screen 100B is displayed when the A-shaped button displayed on the right side of the stock A and the stock B is operated on the management screen 100A (see FIG. 2).

An operator who has seen the management screen 100B shown in FIG. 3 can check the start time and end time of printing for each stock. In other words, the operator can check the printing start time and end time for each printing time. The operator who has seen the management screen 100B can see that the printing of the roll paper defined by the stock A has been executed three times with two interruptions. In addition, the operator who has seen the management screen 100B knows that printing of the roll paper defined by the stock B has been executed once.

When both the V-shaped button displayed on the right side of the stock A and stock B shown in FIG. 3 are operated, the display returns to the management screen 100A shown in FIG. 2. The management screen 100B shown in FIG. 3 is an example of a first screen. In a narrow sense, the display of a row associated with each stock is an example of the first image.

Figure 4:
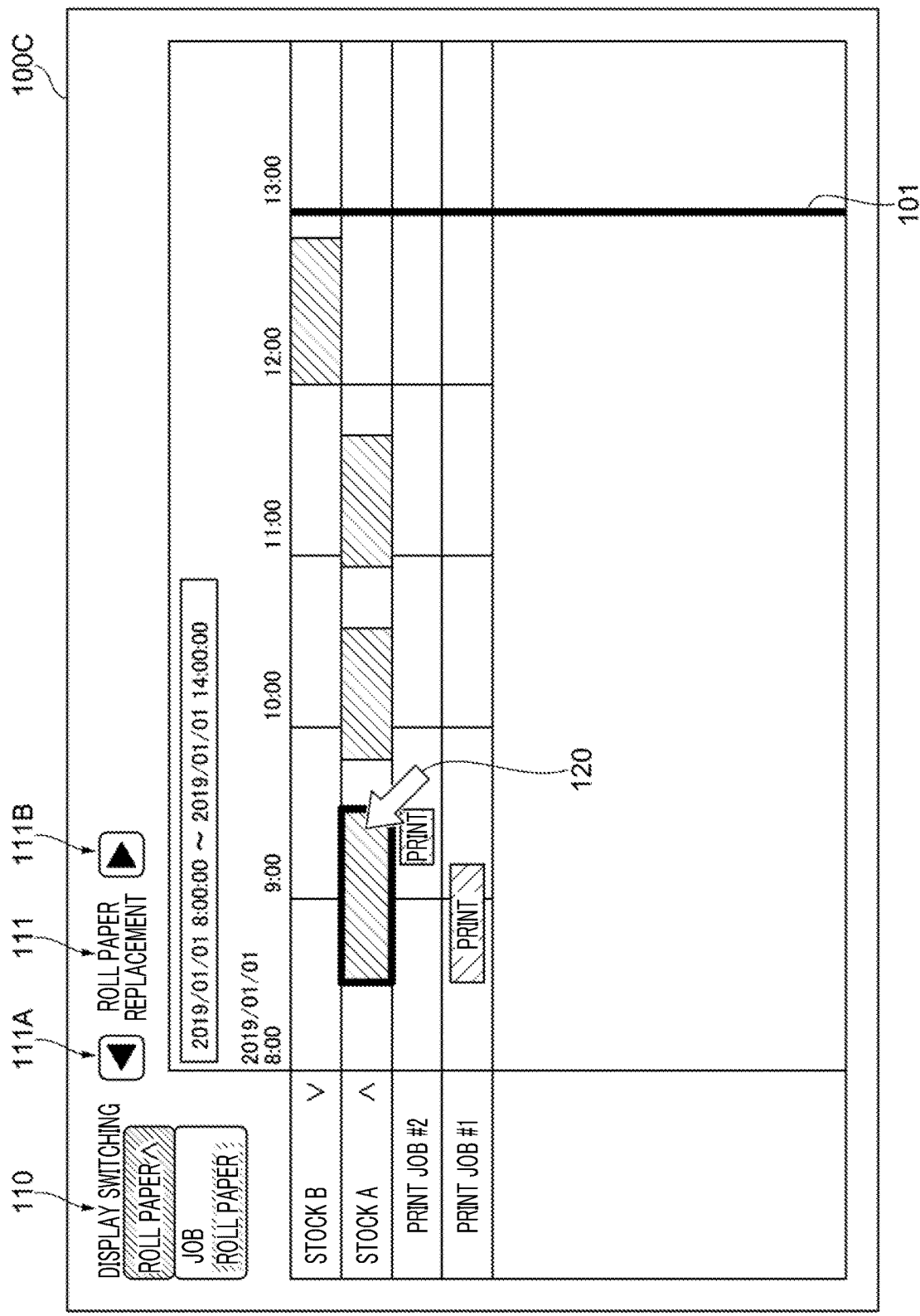
FIG. 4 is a diagram showing another display example of the timeline generated and displayed by the management server used in Exemplary Embodiment 1.

FIG. 4 is a diagram showing another display example of the timeline generated and displayed by the management server 30 used in Exemplary Embodiment 1. In FIG. 4, reference symbols are given corresponding to those in FIG. 3.

A management screen 100C shown in FIG. 4 shows a state where the first printing time executed for the stock A is selected with a cursor 120. In FIG. 4, the selected printing time is surrounded by a bold line. Since a specific printing time is selected, two print jobs #1 and #2 executed in the first printing time are displayed on the management screen 100C shown in FIG. 4.

When the A-shaped button displayed on the right side of the stock A is operated, the display returns to the management screen 100B shown in FIG. 3.

Recording of Print Job History

Hereinafter, a specific example of a process for correlating a print job history with roll paper will be described with reference to FIGS. 5 and 6.

Figure 5:
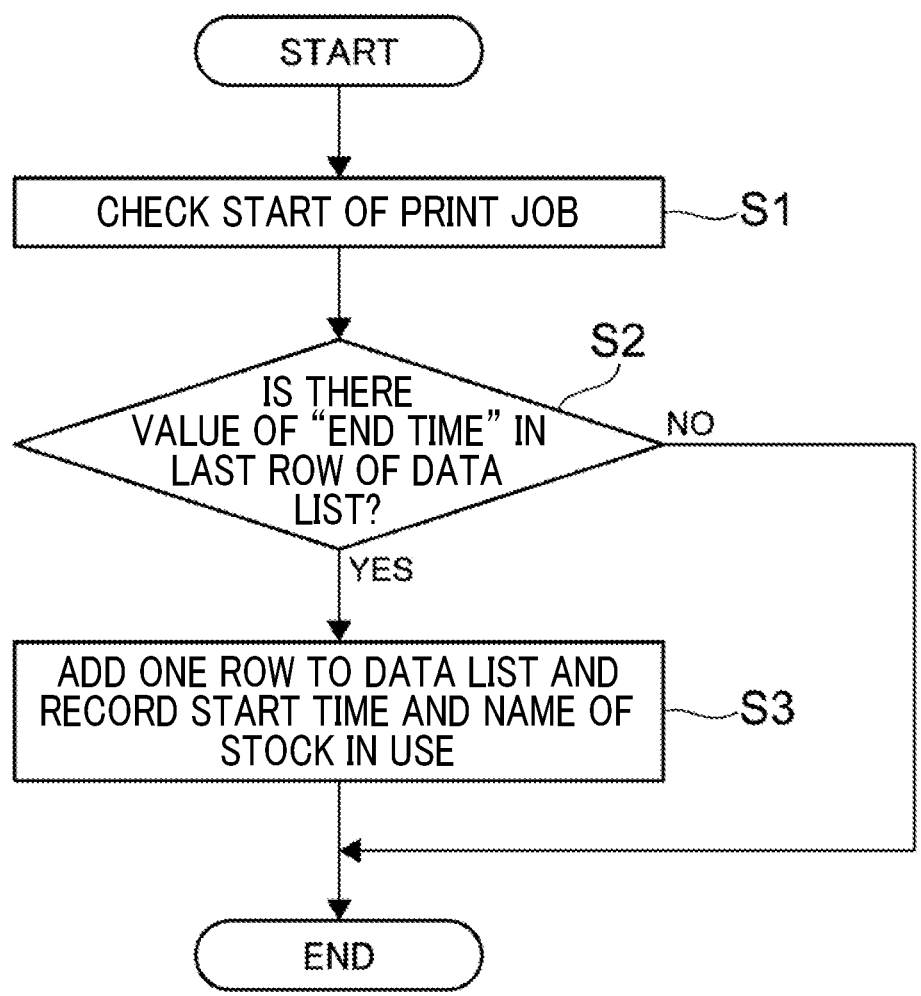
FIG. 5 is a flowchart for explaining an example of a process for recording a start time of printing times executed for each roll paper.

FIG. 5 is a flowchart for explaining an example of a process for recording a start time of printing times executed for each roll paper.

Figure 6:
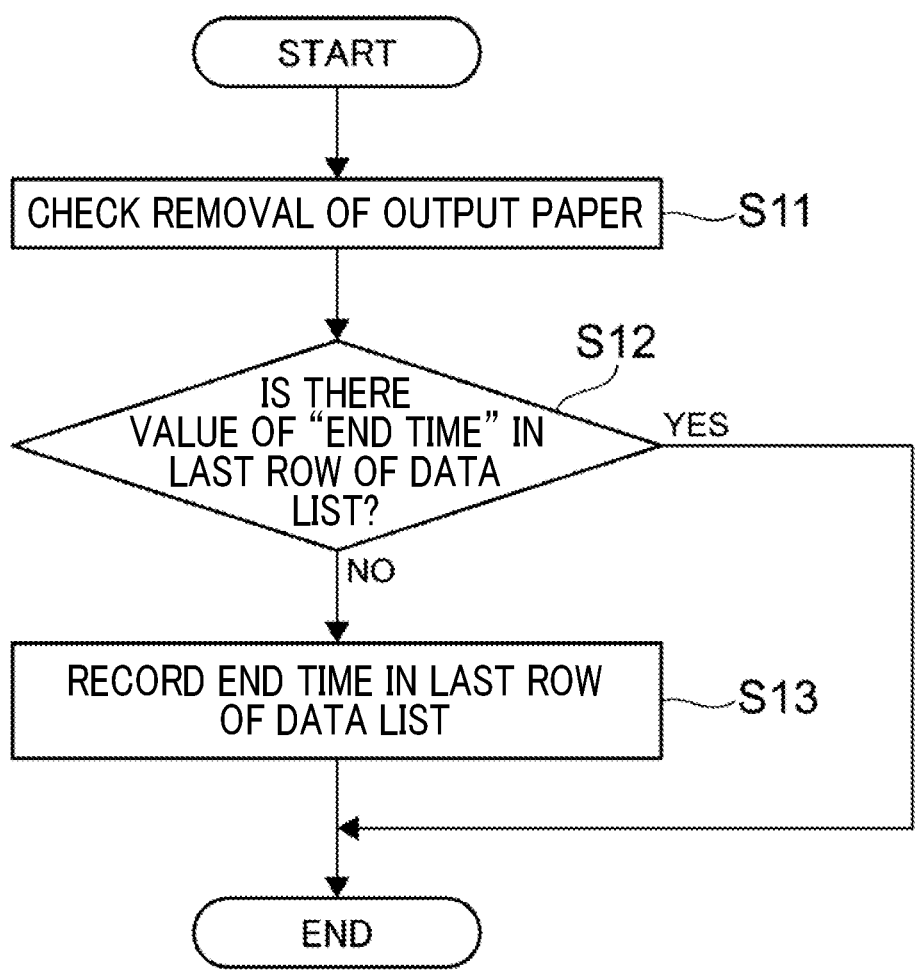
FIG. 6 is a flowchart for explaining an example of a process for recording an end time of printing times executed for each roll paper.

FIG. 6 is a flowchart for explaining an example of a process for recording an end time of printing times executed for each roll paper.

The symbol S in FIGS. 5 and 6 means a step.

The print start time and end time here mean not the start time and end time of each print job, but the start time and end time for each printing time. This is because one roll paper is physically consumed in one printing time.

Therefore, even if three print jobs are executed, if they are executed continuously, only the start time of the first print job and the end time of the third print job are recorded.

In addition to the start time and end time, a name of the stock that defines the attributes of the roll paper consumed for printing is also recorded. These pieces of information are recorded in the data list of the storage device 32 (see FIG. 1).

First, the processor 31 (see FIG. 1) checks the start of a print job through communication with the image forming apparatus 10 (see FIG. 1) (step 1). For example, the start of print job #1 in FIG. 2 is checked.

Next, the processor 31 determines whether or not there is a value of "end time" in the last row of the data list (step 2). This is because, as will be described later, one row is assigned to the data list for each printing time.

If there is a value for the end time, the processor 31 obtains a positive result. This determination is obtained when the first print job after the roll paper is replaced starts.

If a positive result is obtained in step 2, the processor 31 adds one row to the data list and records the start time and the name of the stock in use (step 3).

On the other hand, if the value for the end time is not found in the determination in step 2, the processor 31 obtains a negative result. This determination is obtained when printing of the next print job is started continuously after the previous print job as one printing time.

If a negative result is obtained in step 2, the processor 31 ends the process of recording the start time and the like without updating the data list.

Next, a process related to the recording of the end time shown in FIG. 6 will be described.

First, the processor 31 checks the removal of the output paper through communication with the image forming apparatus 10 (see FIG. 1) (step 11). For example, in the case of FIG. 2, there is a free time between the first printing time and the second printing time of the stock A. This free time is checked.

Next, the processor 31 determines whether or not there is a value of "end time" in the last row of the data list (step 12).

If there is no value for the end time, the processor 31 obtains a negative result. This determination is obtained when one roll paper to be output is completed.

If a negative result is obtained in step 12, the processor 31 records the end time in the last row of the data list (step 13).

On the other hand, if the value for the end time is found in the determination in step 12, the processor 31 obtains a positive result. This determination can occur when the removal of the roll paper is checked separately from the printing times recorded in the data list. If a positive result is obtained in step 12, the processor 31 ends the process without updating the data list.

Specific Example of Data List Update

Hereinafter, a specific example of updating the data list will be described with reference to FIGS. 7 to 9.

Figure 7:
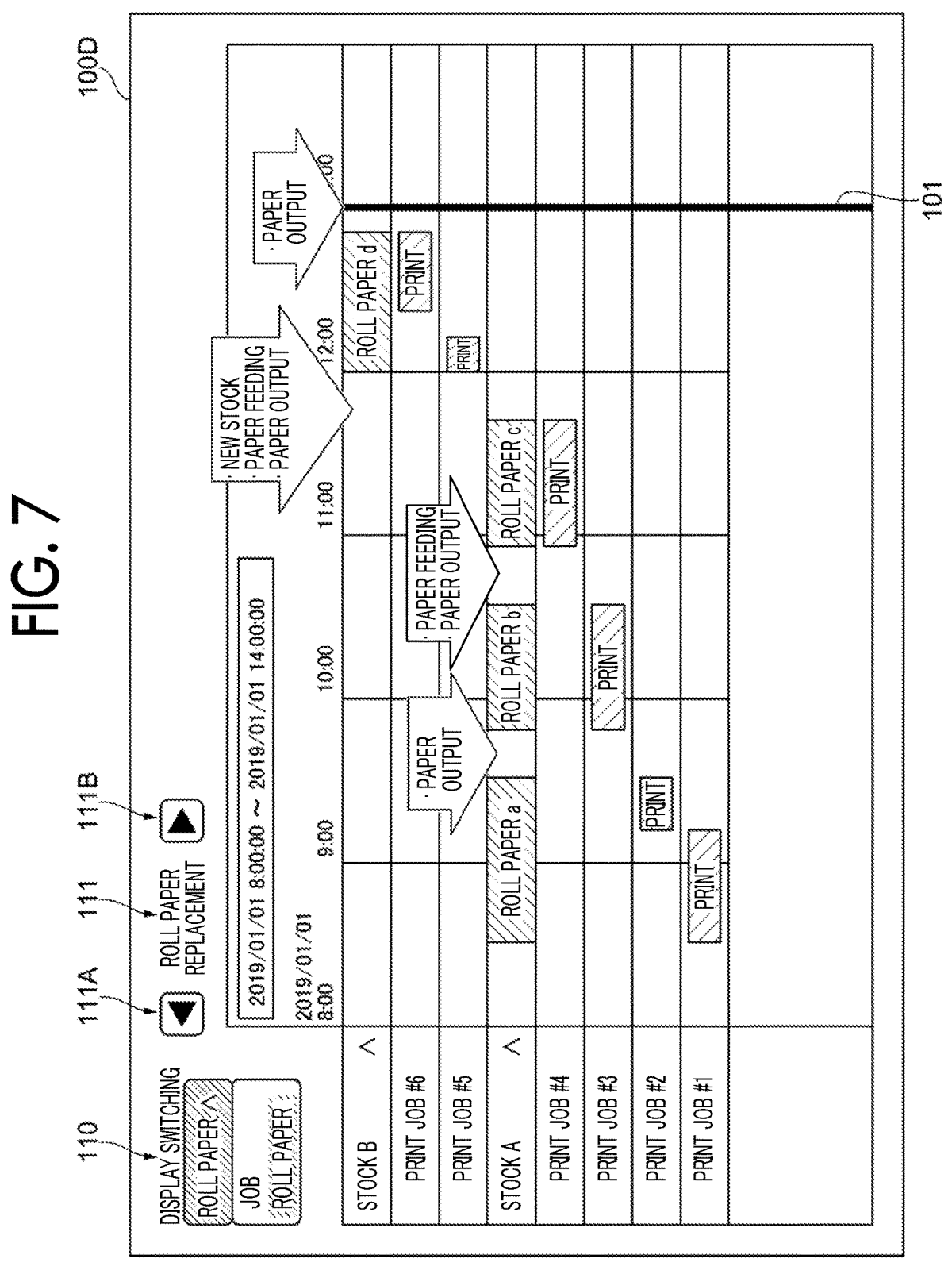

FIG. 7 is a diagram for explaining the contents of events reflected in the timeline. In FIG. 7, reference symbols are given corresponding to those in FIG. 2.

In FIG. 7, for convenience of explanation, names are given to the roll papers corresponding to the printing times corresponding to the stocks A and B. The printed paper corresponding to the first printing time of the stock A is named "roll paper a", the printed paper corresponding to the second printing time of the stock A is named "roll paper b", and the printed paper corresponding to the third printing time of the stock A is named "roll paper c". The printed paper corresponding to the first printing time of the stock B is named "roll paper d".

The management screen 100D corresponds to the management screen 100A in FIG. 2.

The display of the management screen 100D is based on the following facts.

The printing corresponding to print jobs #1 to #6 is executed between 8:00 and 13:00.

For printing of print jobs #1 to #4, paper having the same attributes, that is, stock A is consumed. Even when it is originally a single roll paper, when the paper is physically separated from the original roll paper when the paper is output from the image forming apparatus 10, the two are handled as different roll papers.

When printing of print job #1 and print job #2 ends, the paper corresponding to the print job #1 and the print job #2 is removed from the image forming apparatus 10. This operation is "paper output", and the removed roll paper is roll paper a.

For printing of print job #3, the entire printed paper is delivered. Therefore, the print job #3 is associated with only one printed roll paper b.

The remaining amount of roll paper after printing of print jobs #1 to #3 is insufficient for printing of print job #4. Therefore, when printing of the print job #3 ends, a new roll paper c is attached to the image forming apparatus 10 (see FIG. 1) as the supply roll 12A (see FIG. 1). However, the attributes of the roll paper c are the same as those of the roll papers a and b. The attachment of the roll paper c is "paper feeding". When the roll paper c is attached to the image forming apparatus 10, the roll paper b is also removed from the image forming apparatus 10.

For printing of print jobs #5 and #6, paper having the same attributes, that is, stock B is consumed. The stock B is different from the stock A. Therefore, when printing of the print job #4 ends, a roll paper d having another attributes is attached to the image forming apparatus 10 as the supply roll 12A. When the roll paper d is attached to the image forming apparatus 10, the roll paper c is removed from the image forming apparatus 10.

Figure 8:
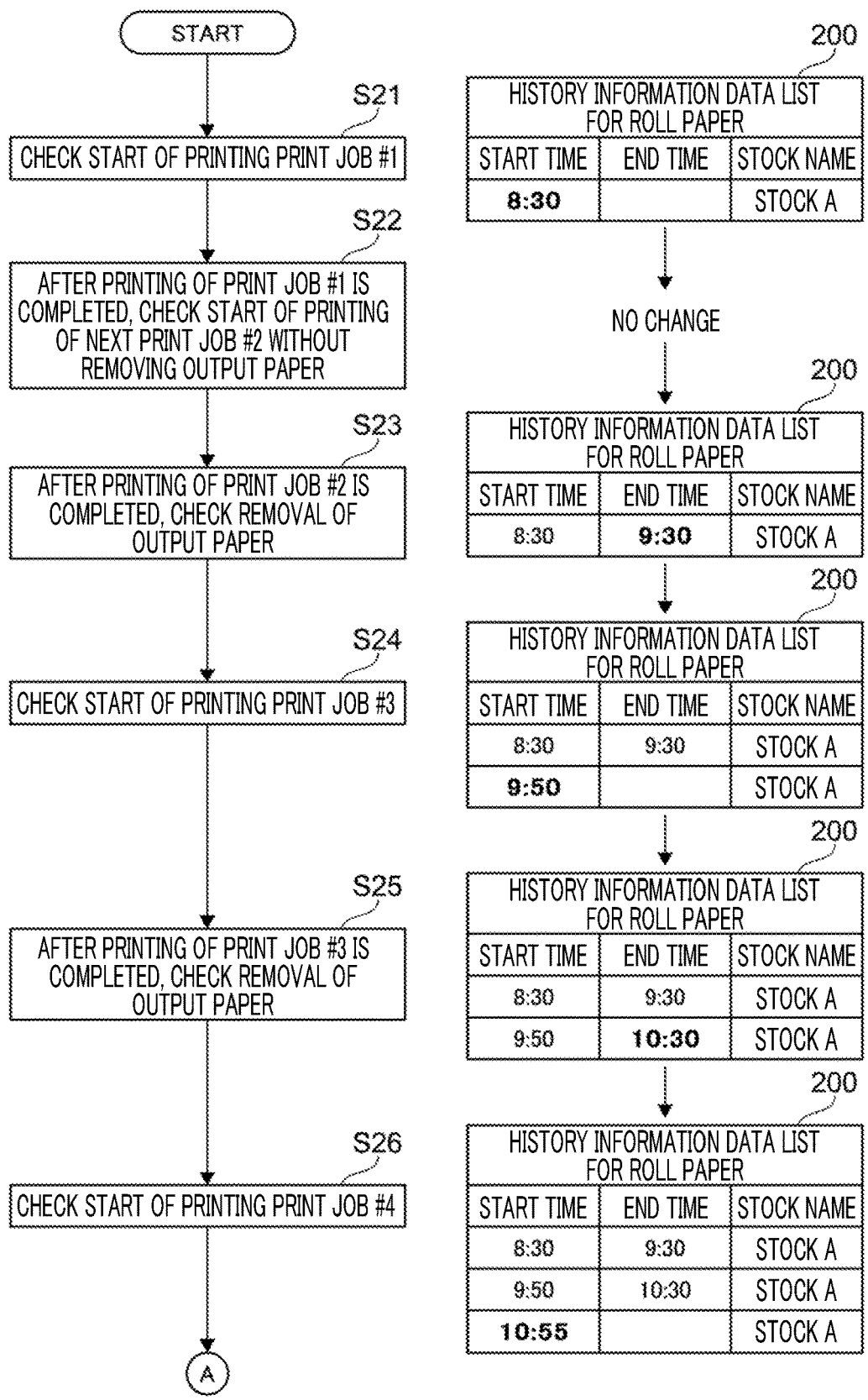
FIG. 8 is a diagram showing the relationship between the progress of a print job and the update of a data list.

FIG. 8 is a diagram showing the relationship between the progress of a print job and the update of a data list 200.

Figure 9:
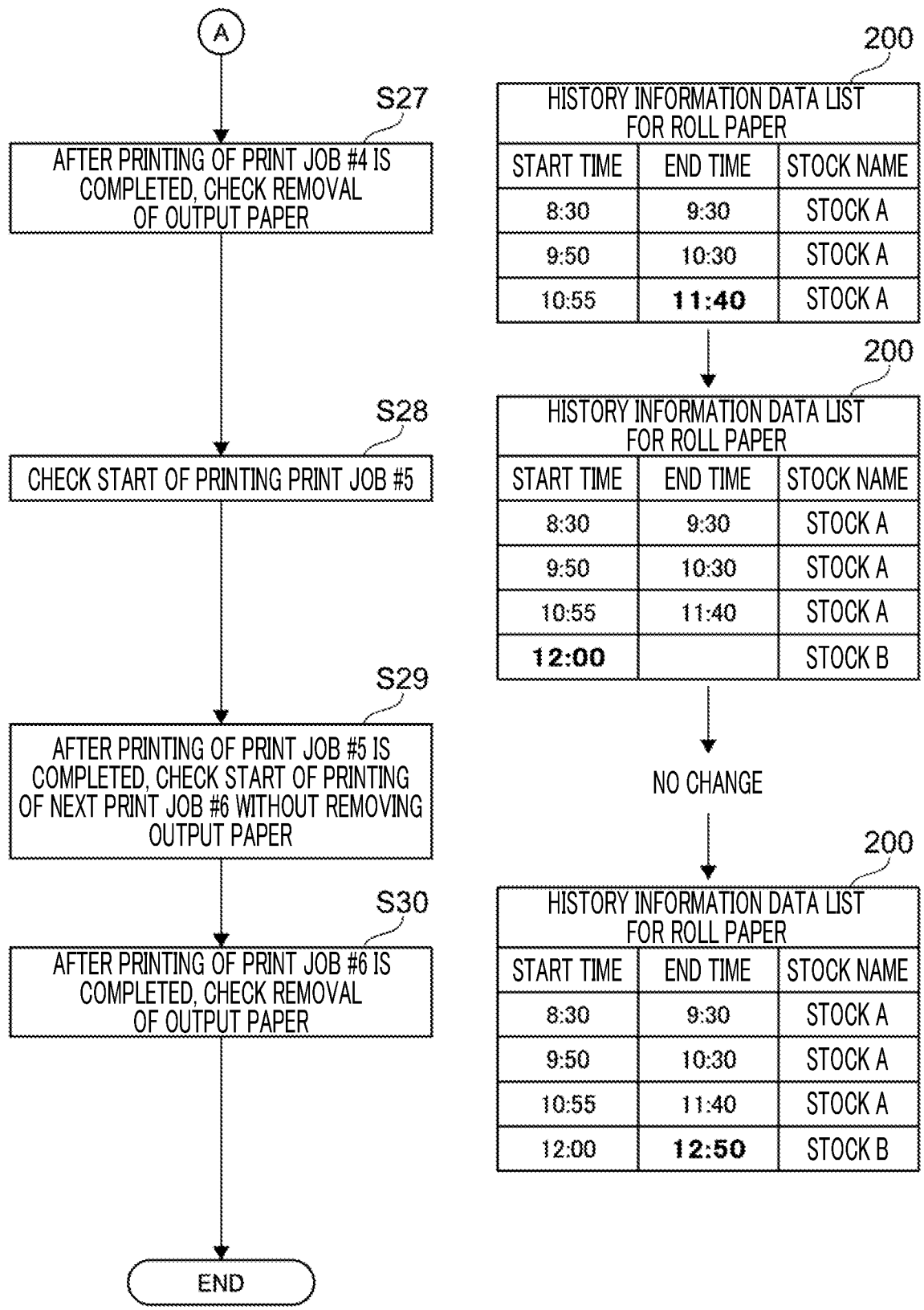
FIG. 9 is a diagram showing the continuation of the relationship between the progress of the print job and the update of the data list.

FIG. 9 is a diagram showing the continuation of the relationship between the progress of the print job and the update of the data list 200.

First, the processor 31 (see FIG. 1) checks the start of printing of print job #1 (step 21). In the present exemplary embodiment, since there is no other print job before the print job #1, the processor 31 records 8:30 in the start time field of data list 200 and stock A as a stock name.

Next, after completing the printing of the print job #1, the processor 31 checks the start of the printing of the next print job #2 without removing the output paper (step 22). This event is neither an event for recording the start time nor an event for recording the end time. For this reason, the processor 31 does not change the data list 200.

Thereafter, the processor 31 checks the removal of the output paper after the printing of the print job #2 is completed (step 23). The removal of the output paper is an event for recording the end time, but the end time is not recorded in the last row. Therefore, the processor 31 records 9:30 in the end time field of the last row of the data list 200.

Next, the processor 31 checks the start of the printing of print job #3 (step 24). In this case, the end time is recorded in the last row of the data list 200. Therefore, the processor 31 adds one row below the last row of the data list 200 and records a new start time and a stock name. In this example, 9:50 is recorded in the start time, and stock A is recorded in the stock name.

Thereafter, the processor 31 checks the removal of the output paper after the printing of the print job #3 is completed (step 25). The removal of the output paper is an event for recording the end time. In the case of this example, since the end time is not recorded in the last row, the processor 31 records 10:30 in the end time field of the last row.

Subsequently, the processor 31 checks the start of the printing of print job #4 (step 26). In this case, the end time is recorded in the last row of the data list 200. Therefore, the processor 31 adds one row below the last row of the data list 200 and records a new start time and a stock name. In this example, 10:55 is recorded in the start time, and stock A is recorded in the stock name.

Thereafter, the processor 31 checks the removal of the output paper after the printing of the print job #4 is completed (step 27). The removal of the output paper is an event for recording the end time. In the case of this example, since the end time is not recorded in the last row, the processor 31 records 11:40 in the end time field of the last row.

Subsequently, the processor 31 checks the start of the printing of print job #5 (step 28). In this case, the end time is recorded in the last row of the data list 200. Therefore, the processor 31 adds one row below the last row of the data list 200 and records a new start time and a stock name. In this example, 12:00 is recorded in the start time, and stock B is recorded in the stock name. This is because the attributes of the paper consumed for printing of the print job #5 is different from that of the stock A.

After completing the printing of the print job #5, the processor 31 checks the start of the printing of the next print job #6 without removing the output paper (step 29). In this case, as in the case of print job #2, the data list 200 is not changed.

Eventually, the processor 31 checks the removal of the output paper after the printing of the print job #6 is completed (step 30). The removal of the output paper is an event for recording the end time. In the case of this example, since the end time is not recorded in the last row, the processor 31 records 12:50 in the end time field of the last row.

As described above, the print job execution history is recorded in the data list 200. The management screen 100A shown in FIG. 2 is displayed with reference to the data list 200 corresponding to step 30.

Another Display Example of Timeline

Figure 10:
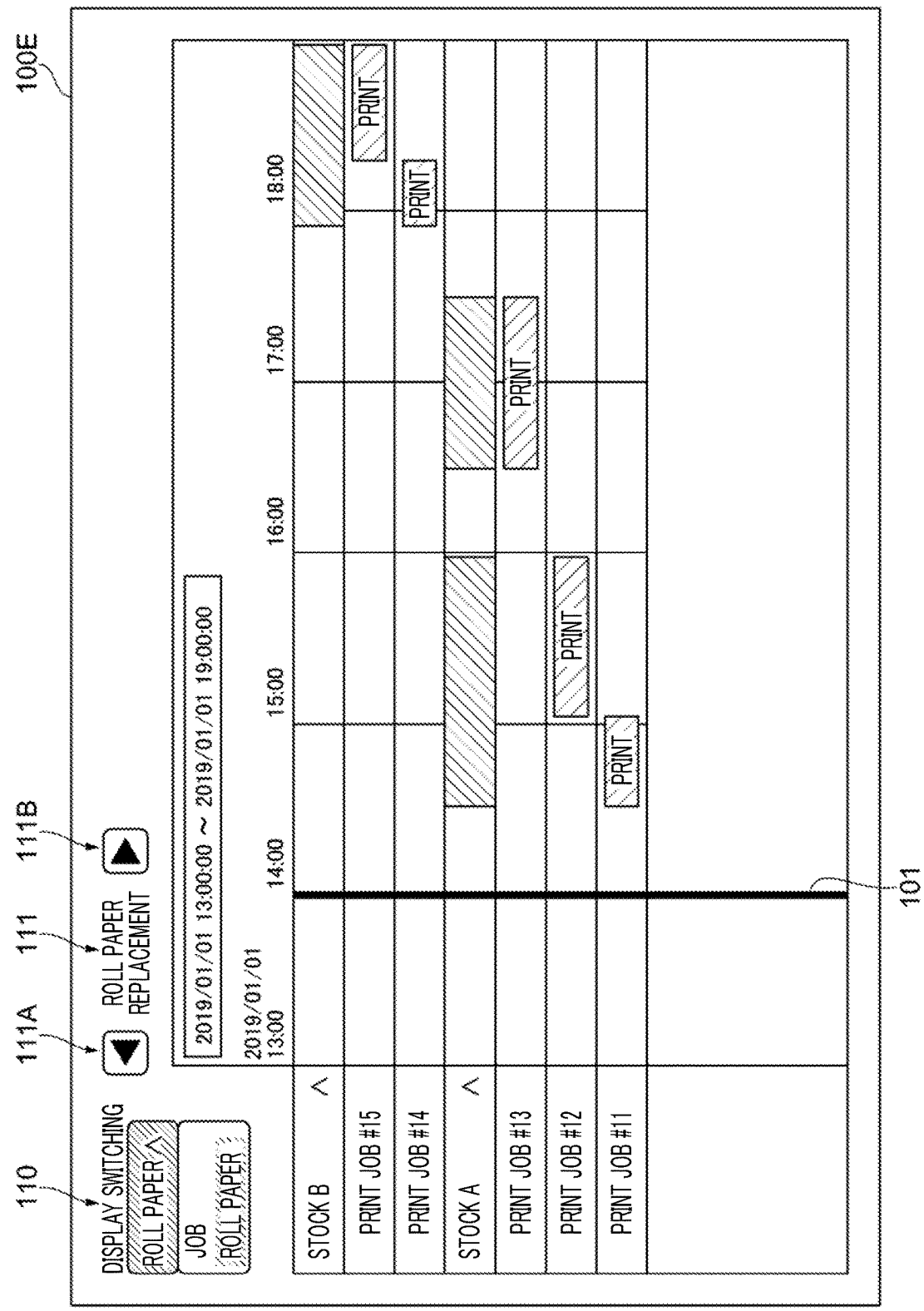
FIG. 10 is a diagram showing another display example of the timeline generated and displayed by the management server used in Exemplary Embodiment 1.

FIG. 10 is a diagram showing another display example of the timeline generated and displayed by the management server 30 used in Exemplary Embodiment 1. In FIG. 10, reference symbols are given corresponding to those in FIG. 2.

In the management screen 100E shown in FIG. 10, print jobs #11 to #15 are displayed on the right side of the bold line 101 indicating the current time, that is, in the future time slot. That is, the management screen 100E represents the schedules for the print jobs #11 to #15. The schedule time slot displayed on the management screen 100E is between 14:00 and 19:00.

The management screen 100E schedules printing by using the order in which print jobs are input to the management server 30 (see FIG. 1) as the execution order of printing.

In the case of FIG. 10, the print job #11 and the print job #12 are associated with the stock A because a roll paper having the same attributes is designated. The attributes of the paper designated by print job #13 are the same as those designated by the print jobs #11 and #12. For this reason, the schedule is also recorded in the print job #13 in association with the stock A. The attributes of the paper designated by the print job #14 and the print job #15 are the same, but are different from the attributes specified by stock A. For this reason, the schedule is recorded in the print job #14 and the print job #15 in association with the stock B.

In the case of FIG. 10, the start time and end time of the print job are both scheduled times.

In the display of the management screen 100E shown in FIG. 10, the continuously executed print jobs are displayed as the same printing times. Examples are the relationship between the print jobs #11 and #12 of the stock A, and the relationship between the print jobs #14 and #15 of the stock B.

For this reason, it becomes easier for the user to monitor the timing for replacing the roll paper by paying attention to the blank period provided between plural printing times corresponding to the same stock or the blank period provided between different stocks. Further, unlike the case where only the print job is displayed, it is easy to monitor the roll paper replacement time and the number of times, and it is also easy to reconsider the schedule considering these.

Recording Print Job Schedule

Hereinafter, a specific example of a process for recording a print job schedule will be described.

Figure 11:
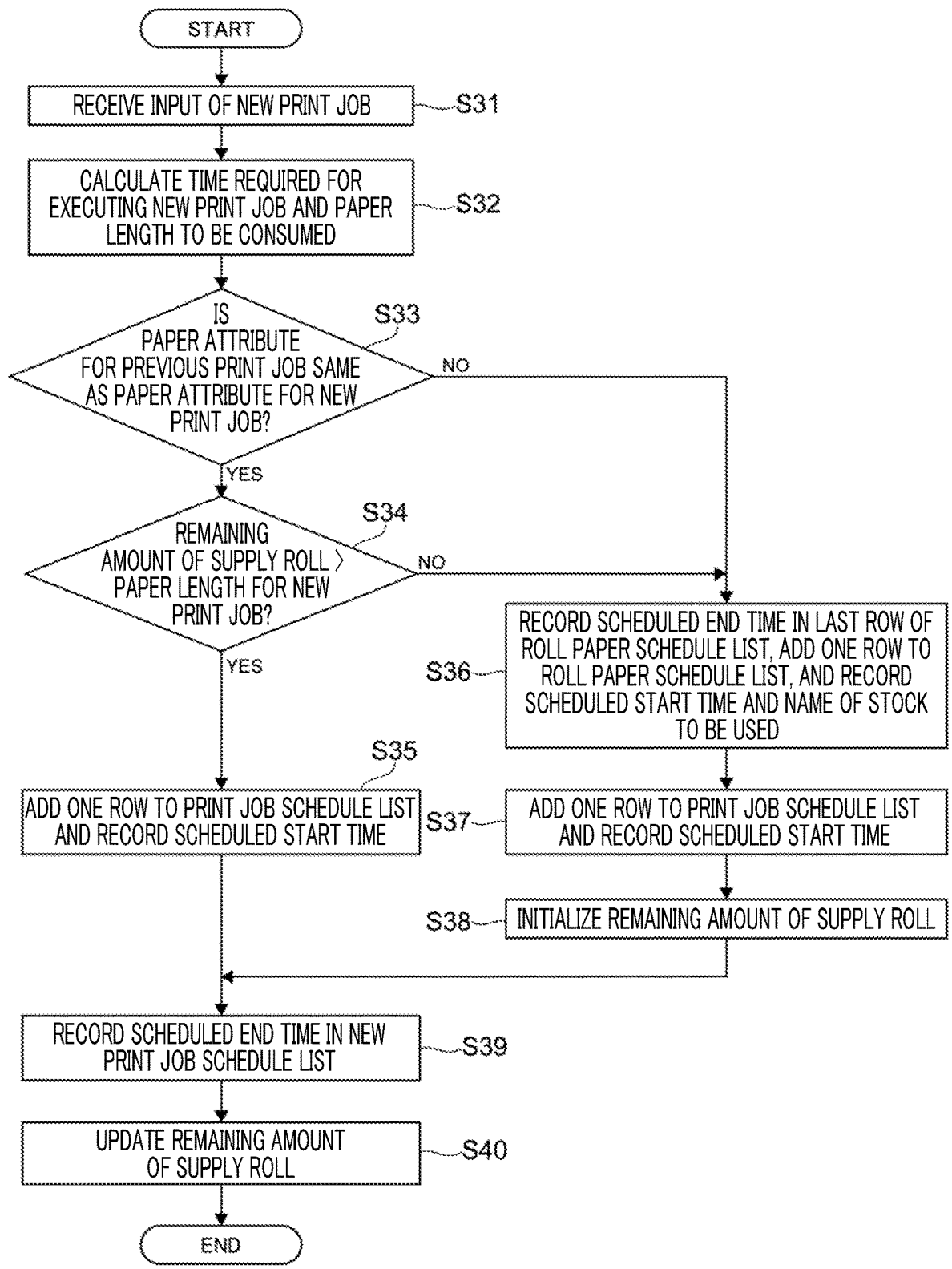
FIG. 11 is a flowchart showing an example of a process for determining a printing schedule for each roll paper.

FIG. 11 is a flowchart showing an example of a process for determining a printing schedule for each roll paper. The symbol S in FIG. 11 means a step.

The flowchart shown in FIG. 11 is based on the following matters.

A roll paper schedule list and a print job schedule list are prepared, and schedule information is added to them.

In the roll paper schedule list, a scheduled start time, a scheduled end time, and stock information are recorded for each printing time.

In the print job schedule list, a scheduled start time, a scheduled end time, and a job name are recorded for each print job.

A new roll paper is given a known paper length.

It is possible to manage the remaining amount of roll paper removed during use. For example, when the paper is removed from the image forming apparatus 10 (see FIG. 1), the value of the remaining amount of paper estimated from the weight of the roll paper or the like is recorded on a sticky note by an operator and attached to each roll paper.

A constant that is a guide for the time required to replace the roll paper is set. In the case of this exemplary embodiment, it is 30 minutes.

First, when receiving a new print job input (step 31), the processor 31 (see FIG. 1) calculates the time required for executing the new print job and the paper length to be consumed (step 32).

Next, the processor 31 determines whether or not the paper attributes of the previous print job are the same as the paper attributes of the new print job (step 33).

If the paper attributes of the previous print job are the same as the paper attributes of the new print job, the processor 31 obtains a positive result in step 33. In this case, the processor 31 determines whether or not the remaining amount of the supply roll 12A (see FIG. 1) is longer than the paper length of the new print job (step 34).

If the remaining amount of the supply roll 12A is longer than the paper length of the new print job, the processor 31 obtains a positive result in step 34. If a positive result is obtained in both step 33 and step 34, the processor 31 adds a row to the print job schedule list and records the scheduled start time (step 35).

In this case, since the execution of a new print job is scheduled following the previous print job, the scheduled end time of the previous print job is recorded in the scheduled start time corresponding to the new print job.

On the other hand, in step 33, if the paper attributes of the previous print job are different from the paper attributes of the new print job, the processor 31 obtains a negative result in step 33. In this case, the processor 31 records the scheduled end time in the last row of the roll paper schedule list, adds one row to the roll paper schedule list, and records the scheduled start time and the name of the stock to be consumed (step 36).

Thereafter, the processor 31 adds a row to the print job schedule list to record the scheduled start time (step 37), and subsequently initializes the remaining amount of the supply roll (step 38).

In this case, the scheduled start time is recorded with a time obtained by adding a constant serving as a guide for the time required for replacing the roll paper to the scheduled end time of the previous print job. In addition, as the remaining amount of the supply roll, the paper length of the roll paper having the paper attributes designated by the new print job is recorded. Here, when a new roll paper is attached, the paper length of the new roll paper is read and set.

When the roll paper removed during use is attached, the paper length recorded on a sticky note paper or the like is set by the operator.

In step 34, if the remaining amount of the supply roll 12A is shorter than the paper length of the new print job, the processor 31 obtains a negative result in step 34, moves to step 36, and executes the above-described process.

After step 35 or after step 38, the processor 31 records the scheduled end time in the new print job schedule list (step 39). The scheduled end time here is a time obtained by adding the time required for executing the print job to the scheduled start time of the new print job.

Thereafter, the processor 31 updates the remaining amount of the supply roll 12A (step 40). As the remaining amount, a value obtained by subtracting the paper length consumed by printing of a new print job from the latest value of the remaining amount of the supply roll 12A is used.

Specific Example of Data List Update

Hereinafter, a specific example of updating the schedule list will be described with reference to FIGS. 12 to 14.

Figure 12:
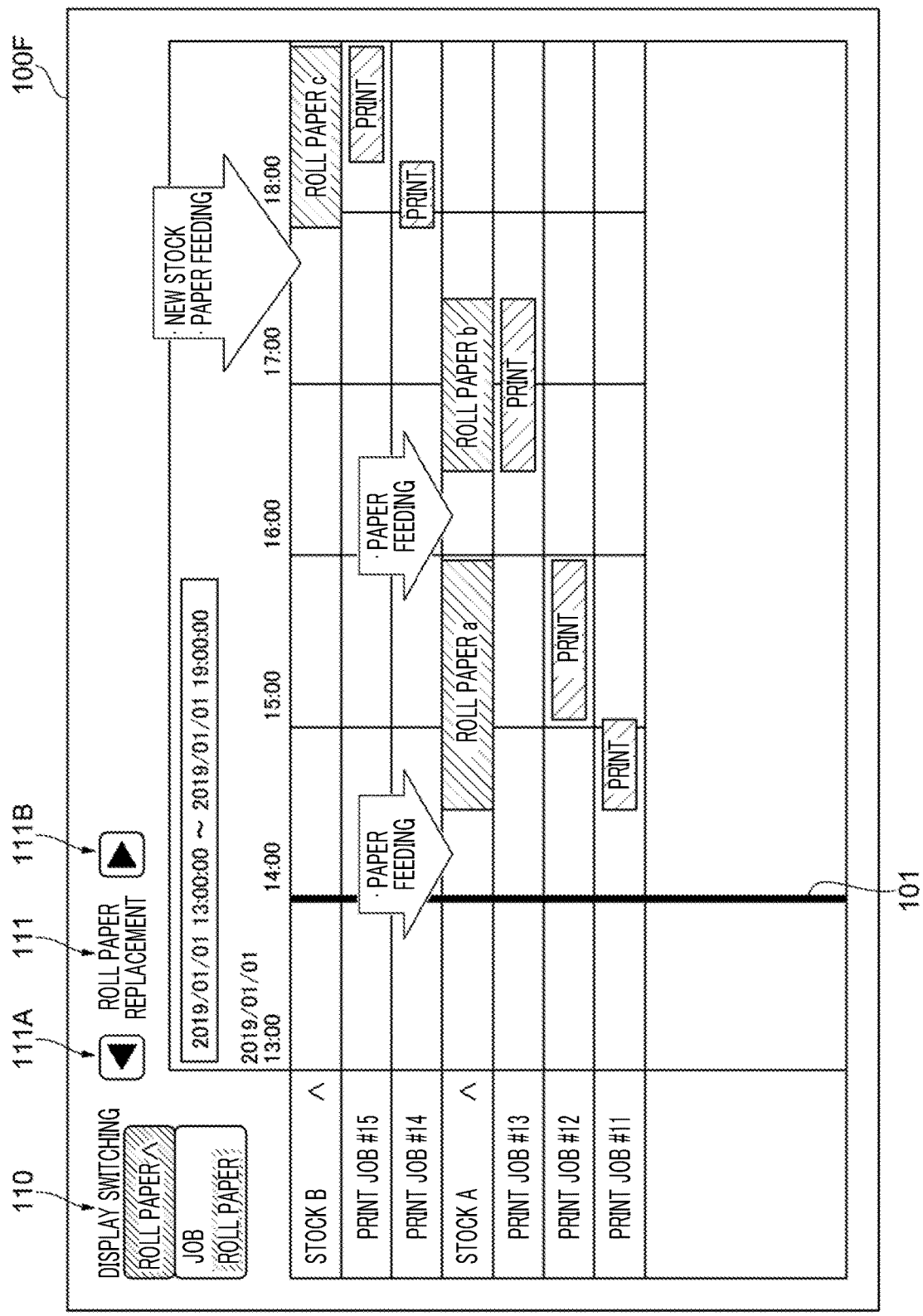
FIG. 12 is a diagram for explaining the contents of events reflected in the timeline.

FIG. 12 is a diagram for explaining the contents of events reflected in the timeline. In FIG. 12, reference symbols are given corresponding to those in FIG. 2.

Also in the case of FIG. 12, for convenience of explanation, names are given to the roll papers corresponding to the printing times corresponding to the stocks A and B. The printed paper corresponding to the first printing time of the stock A is named "roll paper a", the printed paper portion corresponding to the second printing time of the stock A is named "roll paper b", and the printed paper portion corresponding to the first printing time of the stock B is named "roll paper c".

The management screen 100F corresponds to the management screen 100A in FIG. 2.

The display of the management screen 100F is based on the following facts.

There are stock A and stock B with different paper attributes.

At 14:00, print jobs #11 to #15 are sequentially input to the management server 30 (see FIG. 1).

The print jobs #11 to #13 use paper having the same attributes, that is, stock A. However, the remaining amount of roll paper after printing of the print job #11 and print job #12 is insufficient for printing of the print job #13. Therefore, a new roll paper b needs to be attached to the image forming apparatus 10 (see FIG. 1) before the print job #13 is printed.

For printing of the print jobs #14 and #15, paper having the same attributes, that is, stock B is consumed. The stock B is different from the stock A. Therefore, when printing of the print job #13 ends, another type of roll paper c is attached to the image forming apparatus 10 as the supply roll 12A, and a new stock is set.

Figure 13:
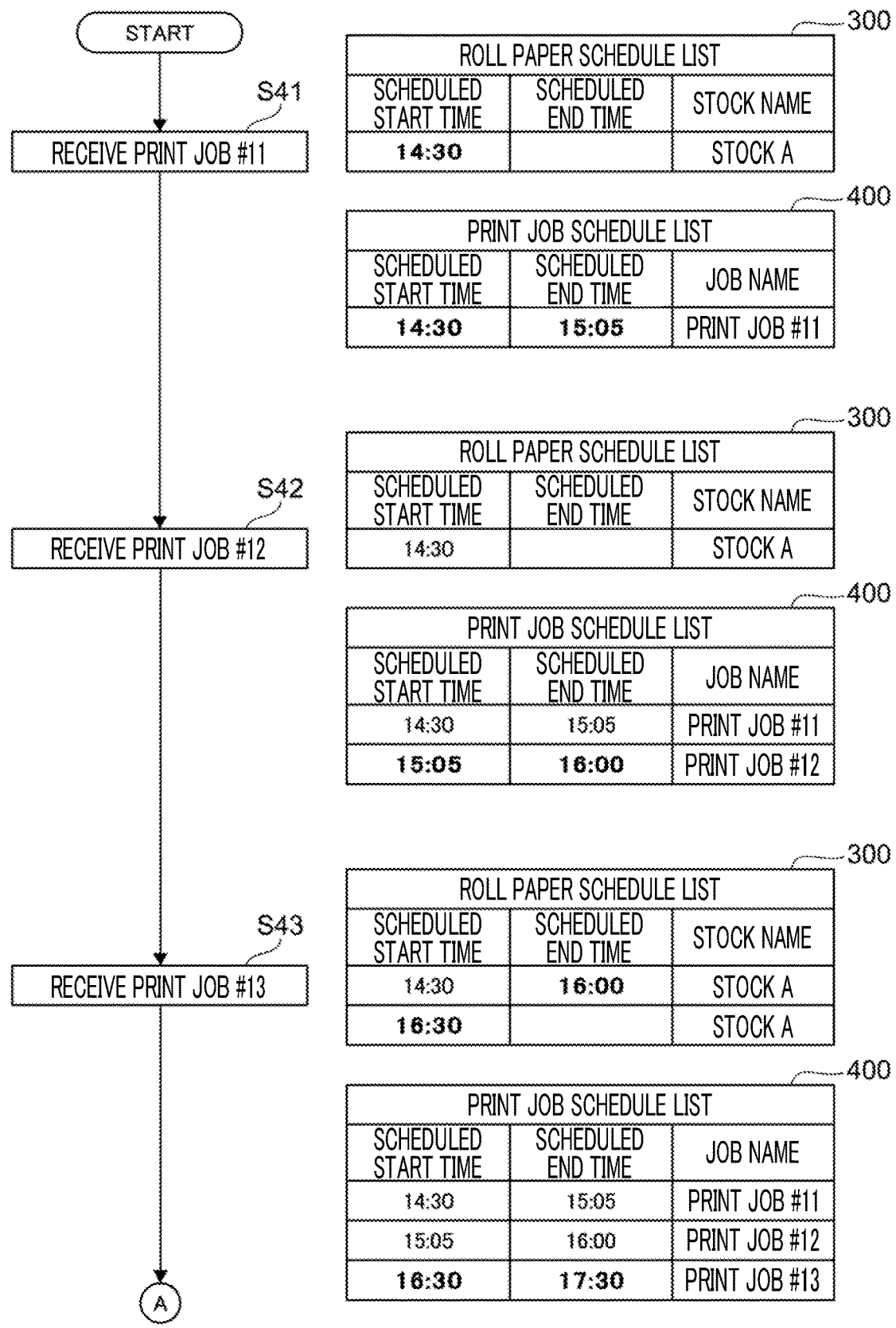
FIG. 13 is a diagram for explaining the relationship of updating schedule lists accompanying reception of a print job.

FIG. 13 is a diagram for explaining the relationship of updating schedule lists 300 and 400 accompanying reception of a print job.

Figure 14:
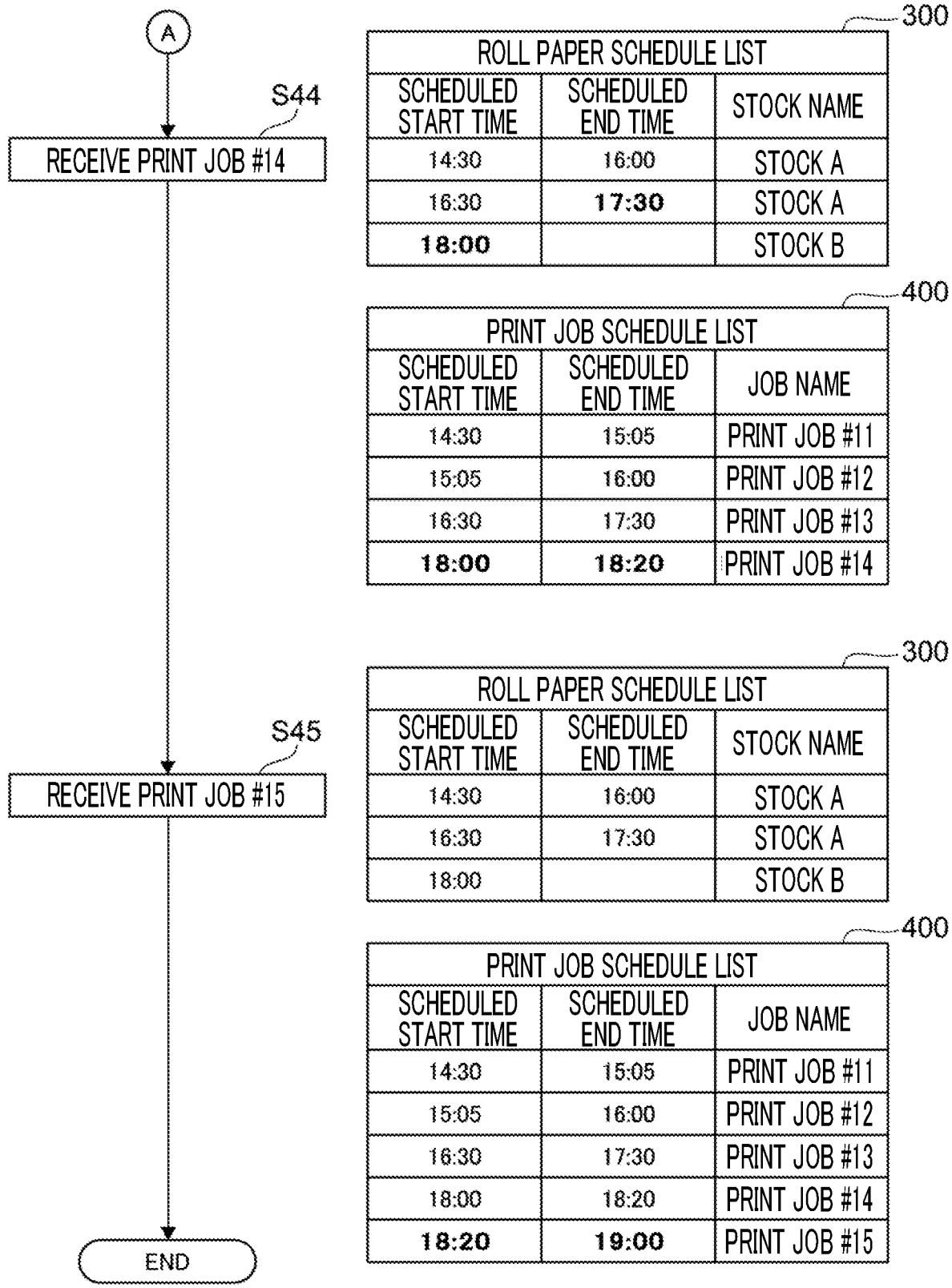
FIG. 14 is a diagram for explaining a continuation of the relationship of updating the schedule lists accompanying reception of a print job.

FIG. 14 is a diagram for explaining a continuation of the relationship of updating the schedule lists 300 and 400 accompanying reception of a print job.

First, the processor 31 (see FIG. 1) receives print job #11 (step 41). In this example, since there is no other print job before the print job #11, processor 31 obtains a negative result in step 33 (see FIG. 11).

In this case, the processor 31 adds a row to the roll paper schedule list 300 and stores the scheduled start time and the stock name. In the case of FIG. 13, 14:30 is recorded as the scheduled start time, and stock A is recorded as the stock name.

The processor 31 adds a row to the print job schedule list 400 and records the scheduled start time, the scheduled end time, and the job name. In the case of FIG. 13, 14:30 is recorded as the scheduled start time, 15:05 is recorded as the scheduled end time, and print job #11 is recorded as the job name.

The processor 31 updates the remaining amount of the supply roll 12A after execution of the print job #11.

Next, the processor 31 receives print job #12 (step 42). In this example, the print job #11 exists before the print job #12. The paper attributes designated in the print job #12 are the same as the paper attributes designated in the print job #11. Further, the remaining amount of the supply roll 12A at the end of the print job #11 is longer than the paper length of the print job #12. In this case, it is not necessary to replace the roll paper. Accordingly, there is no change in the roll paper schedule list 300.

At the same time, the processor 31 adds a row to the print job schedule list 400 and records the scheduled start time, the scheduled end time, and the job name. In the case of FIG. 13, 15:05 is recorded as the scheduled start time, 16:00 is recorded as the scheduled end time, and print job #12 is recorded as the job name.

The processor 31 updates the remaining amount of the supply roll 12A after execution of the print job #12.

Subsequently, the processor 31 receives the print job #13 (step 43). In this example, the print job #12 exists before the print job #13. The paper attributes designated in the print job #13 are the same as the paper attributes designated in the print job #12, but the remaining amount of supply roll 12A at the end of the print job #12 is shorter than the paper length of the print job #13. For this reason, the roll paper needs to be replaced. This case corresponds to a case where a negative result is obtained in step 34 (see FIG. 11).

Therefore, the scheduled end time of the previous printing time is recorded in the first row of the roll paper schedule list 300. Here, 16:00, which is the same as the scheduled end time of print job #12, is recorded as the scheduled end time.

In this case, the processor 31 adds one row to the roll paper schedule list 300 and records the scheduled start time and the stock name. In the case of FIG. 13, 16:30 is recorded as the scheduled start time in the newly added row. The scheduled start time is calculated as a time obtained by adding 30 minutes, which is the time required for replacing the roll paper, to the previous scheduled end time. Stock A is recorded as the stock name.

At the same time, the processor 31 updates the print job schedule list 400. That is, the processor 31 adds a row to the print job schedule list 400 and records the scheduled start time, the scheduled end time, and the job name. In the case of FIG. 13, 16:30 is recorded as the scheduled start time, 17:30 is recorded as the scheduled end time, and print job #13 is recorded as the job name.

The processor 31 updates the remaining amount of the supply roll 12A after execution of the print job #13.

Subsequently, the processor 31 receives the print job #14 (step 44). In this example, the print job #13 exists before the print job #14.

The paper attributes designated in the print job #14 are different from the paper attributes designated in the print job #13. For this reason, the roll paper needs to be replaced. This case corresponds to a case where a negative result is obtained in step 33 (see FIG. 11).

Therefore, the scheduled end time of the previous printing time is recorded in the second row of the roll paper schedule list 300. Here, 17:30, which is the same as the scheduled end time of print job #13, is recorded as the scheduled end time.

In this case, the processor 31 adds one row to the roll paper schedule list 300 and records the scheduled start time and the stock name. In the case of FIG. 14, 18:00 is recorded as the scheduled start time in the newly added row. The scheduled start time is calculated as a time obtained by adding 30 minutes, which is the time required for replacing the roll paper, to the previous scheduled end time. Stock B is recorded as the stock name.

At the same time, the processor 31 updates the print job schedule list 400. That is, the processor 31 adds a row to the print job schedule list 400 and records the scheduled start time, the scheduled end time, and the job name. In the case of FIG. 14, 18:00 is recorded as the scheduled start time, 18:20 is recorded as the scheduled end time, and print job #14 is recorded as the job name.

The processor 31 updates the remaining amount of the supply roll 12A after execution of the print job #14.

Further, the processor 31 receives print job #15 (step 45). In this example, the print job #14 exists before the print job #15.

The paper attributes designated in the print job #15 are the same as the paper attributes designated in the print job #14.

Further, the remaining amount of the supply roll 12A at the end of the print job #14 is longer than the paper length of the print job #15. In this case, it is not necessary to replace the roll paper. Accordingly, there is no change in the roll paper schedule list 300.

At the same time, the processor 31 updates the print job schedule list 400. That is, the processor 31 adds a row to the print job schedule list 400 and records the scheduled start time, the scheduled end time, and the job name. In the case of FIG. 14, 18:20 is recorded as the scheduled start time, 19:00 is recorded as the scheduled end time, and print job #15 is recorded as the job name.

The processor 31 updates the remaining amount of the supply roll 12A after execution of the print job #15.

Example of Changing Schedule for Each Roll Paper

Hereinafter, a schedule editing operation by an operator who has checked the management screen 100F (see FIG. 12) on which a schedule for each roll paper is displayed will be described.

Figure 15:
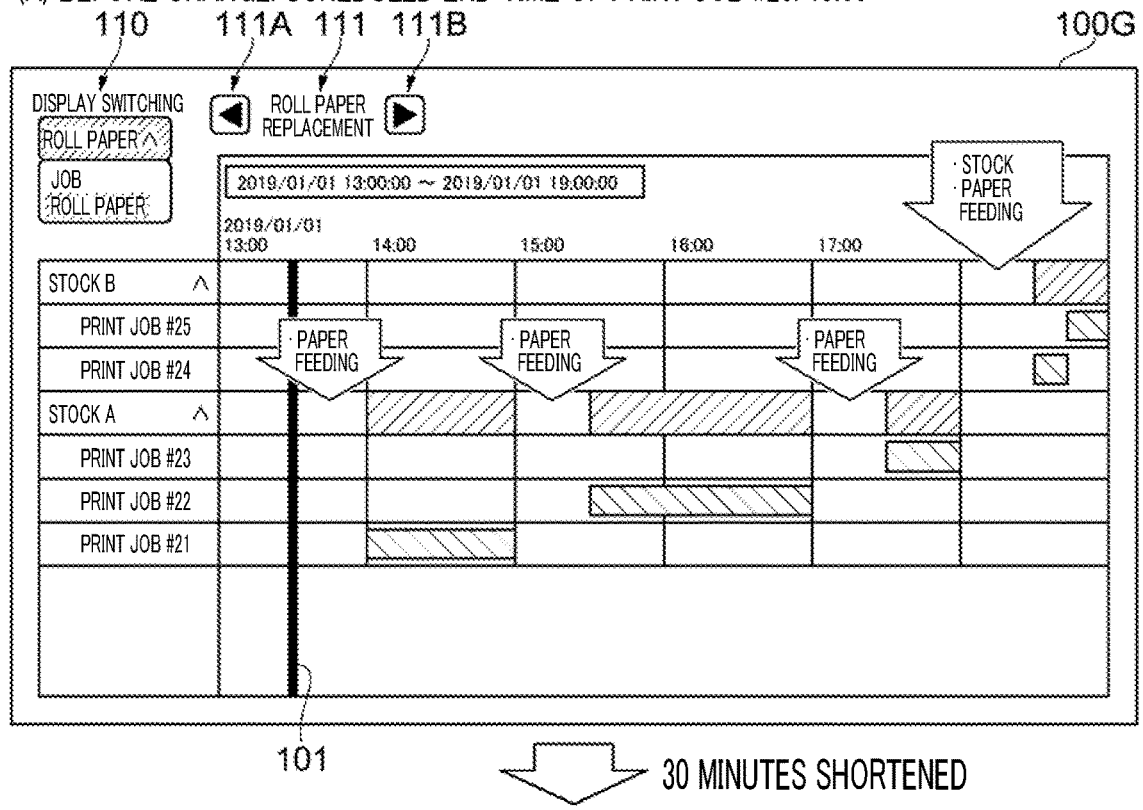
FIG. 15 is a diagram showing an example of schedule change that can be realized by a timeline display for each roll paper.
Figure 15:
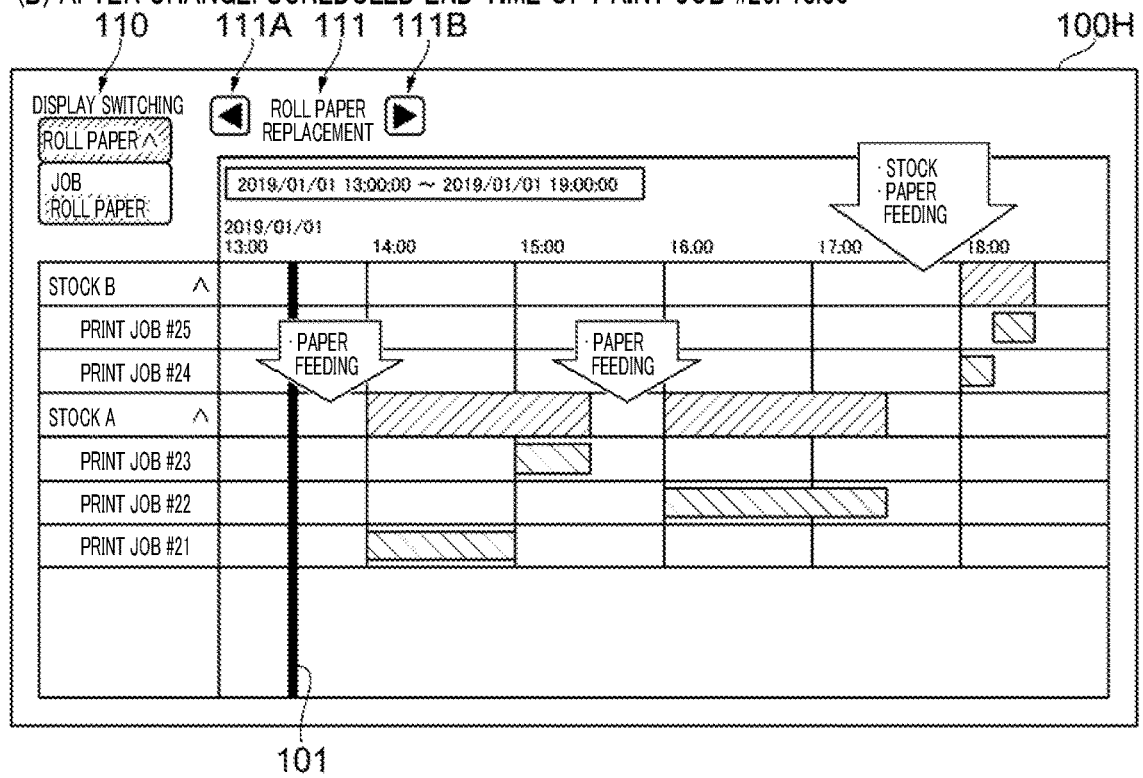

FIG. 15 is a diagram showing an example of schedule change that can be realized by a timeline display for each roll paper. (A) in FIG. 15 shows an example of a management screen 100G showing a schedule before change, and (B) in FIG. 15 shows an example of a management screen 100H showing a schedule after the change.

In the case of FIG. 15 as well, it is assumed that five print jobs #21 to #25 are input to the management server 30 (see FIG. 1) at 14:00. The print jobs #21 to #23 use the same attributes and are associated with stock A, whereas print jobs #24 and #25 are associated with stock B.

On the management screen 100G before changing the schedule, print jobs #21, #22, and #23 are scheduled in the order of input. In the case of FIG. 15, the remaining amount of the supply roll 12A (see FIG. 1) at the time when printing of the print job #21 ends is shorter than the paper length consumed for printing by the print job #22. For this reason, it is necessary to replace the roll paper when the print job #21 ends. Similarly, the remaining amount of the supply roll 12A at the time when printing of the print job #22 ends is shorter than the paper length consumed for printing by the print job #23. For this reason, it is necessary to replace the roll paper when the print job #22 ends. That is, in the case of the schedule shown on the management screen 100G, a total of three paper feeding operations are required for the stock A. The first time is a paper feeding operation for printing the print job #21.

However, when seeing the management screen 100G, it can be seen that the paper length consumed for printing by the print job #23 is short. For this reason, if the print job #23 is arranged at the same printing time as the print job #21, it can be seen that the number of operations for paper feeding can be reduced by one.

The management screen 100H after changing the schedule represents an example in which the print job #23 is printed together with the print job #21 and then the print job #22 is printed. In the case of the management screen 100H, the number of operations for paper feeding is two. In the case of the present exemplary embodiment, since the paper feeding operation takes 30 minutes per time, the scheduled end time of the print job #25 is shortened from 19:00 to 18:30 by changing the schedule.

Further, in the printing of the continuous paper P, it is necessary to start printing after the speed at which the continuous paper P is transported is stabilized so that the printing does not blur, but the continuous paper P transported until the speed becomes stable is discarded without being consumed for printing. That is, it becomes a waste paper. For this reason, if the number of times the roll paper is replaced increases, the waste paper also increases at the start of printing. However, as in this example, if the schedule is changed so that the print job #21 and the print job #23 are continuously printed, the amount of waste paper can be reduced.

Display Shifting to Roll Paper Replacement Time

Here, a case will be described in which the shift button 111 for switching for each roll paper replacement time is operated on the management screen 100E shown in FIG. 10.

FIG. 16 is a diagram for explaining a change in display when shifting to the next replacement time is instructed on the management screen 100E. (A) in FIG. 16 is a diagram explaining the display before a shift button 111B which instructs the shifting to the next replacement time is operated, and (B) in FIG. 16 is a diagram explaining the display after the shift button 111B which instructs the shifting to the next replacement time is operated.

The start time of the management screen 100E is 13:00 in the management screen 100E of (A) in FIG. 16, but the start time of the management screen 100E is changed to 16:30 in the management screen 100E of (B) in FIG. 16 by the operation of the shift button 111B.

Thus, in the case of the management screen 100E used in the present exemplary embodiment, it is easy to check the time when roll paper replacement will occur in the future. When the shift button 111B is operated again, the start time of the management screen 100E is changed to 18:00.

If the shift button 111A is operated, the display is switched at the previous replacement time. If this function is used, it can also be used to search for printed roll paper.

OTHER EXEMPLARY EMBODIMENTS

Although the exemplary embodiments of the present disclosure have been described above, the technical scope of the present disclosure is not limited to the scope described in the above-described exemplary embodiments. It is clear from the scope of the claims that various modifications or improvements made to the exemplary embodiments described above will also fall within the technical scope of the present disclosure.

In the above-described exemplary embodiments, the management server 30 (see FIG. 1) prepared separately from the image forming apparatus 10 (see FIG. 1) is used to display the print job execution history and the schedule on a timeline. However, the same function may be executed by the image forming apparatus 10 alone, or the management server 30 may execute the same function in cooperation with the image forming apparatus 10.

In the above-described exemplary embodiment, it has been described that the management server 30 is connected to the image forming apparatus 10 via a network. However, the network here is not limited to a local area network (LAN), and may be the internet, a dedicated line, or a signal line.

The above exemplary embodiment shows the management screen 100B (see FIG. 3) that displays bar-shaped figures corresponding to the time slots in which the respective stocks have been consumed for printing and the management screens 100A (see FIG. 2) and 100C (see FIG. 4) that display both bar-shaped figures corresponding to the time slots in which the respective stocks are consumed for printing and bar-shaped figures corresponding to the time slots in which the respective print jobs have been executed. Alternatively, one of the management screen 100B and the screen displaying bar-shaped figures corresponding to time slots in which the print jobs have been executed may be selectively switched and displayed.

The processor 31 in each of the exemplary embodiments described above refers to a processor in a broad sense. In addition to a general-purpose processor (for example, a central processing unit (=CPU)), a dedicated processor (for example, a graphical processing unit (=GPU)), an application specific integrated circuit (=ASIC), a field programmable gate array (=FPGA), a program logic device, and the like.

In addition, the operation of the processor 31 in each of the above-described exemplary embodiments may be executed by one processor alone, but may be executed in cooperation by plural processors present at physically separated positions. Further, the order of execution of each operation in the processor is not limited to the order described in each exemplary embodiments described above, and may be changed individually.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a processor that
   manages time slots in which a roll paper has been consumed for printing and time slots in which the roll paper is scheduled to be consumed for printing, and
   controls output of a first image and a second image in both of which figures corresponding to the time slots are arranged according to an attribute of the roll paper along a first axis and time along a second axis, wherein
   position of the time slots along the second axis indicates whether the roll paper has been consumed for printing or the roll paper is scheduled to be consumed for printing,
   the first image represents only print jobs that are scheduled to be completed, and
   the second image represents only print jobs that have been executed.

2. The information processing system according to claim 1, wherein
   when one of the time slots managed for an attribute of paper is selected by a user, the processor arranges, in the first image, time slots in which the print job linked to the selected time slot has been executed or time slots in which the print job is scheduled to be executed for printing.

3. The information processing system according to claim 2, wherein
   the processor performs switching as to whether or not to arrange, in the first image, the figures corresponding to the time slots in which the print job has been executed or the time slots in which the print job is scheduled to be executed, through receiving an operation of a handler associated with the print job linked to the selected time slot.

4. The information processing system according to claim 1, wherein
   the processor sequentially shifts the time slots that are located in an instructed direction to a specific position in the first image when an operation instructing shifting to a point of time at which the roll paper is to be replaced is detected.

5. The information processing system according to claim 1, wherein
   the processor manages the attribute of paper in association with start and end points of the time slot for each roll paper.

6. A non-transitory computer readable medium storing a program causing a computer to execute an information processing process comprising:
   managing time slots in which a roll paper has been consumed for printing and time slots in which the roll paper is scheduled to be consumed for printing; and
   controlling output of a first image and a second image in both of which figures corresponding to the time slots are arranged according to an attribute of the roll paper along a first axis and time along a second axis, wherein
   position of the time slots along the second axis indicates whether the roll paper has been consumed for printing or the roll paper is scheduled to be consumed for printing,
   the first image represents only print jobs that are scheduled to be completed, and
   the second image represents only print jobs that have been executed.

7. A non-transitory computer readable medium storing a program causing a computer to execute an information processing process comprising:
   managing print schedule in which information on print jobs and information on paper to be used for the print jobs are given; and
   outputting first image information and second image information both corresponding to the print job by displaying figures corresponding to time slots arranged according to an attribute of the paper along a first axis and time along a second axis, wherein
   position of the time slots along the second axis indicates whether the paper has been consumed for printing or the paper is scheduled to be consumed for printing,
   the first image information represents the print jobs as scheduled to be completed, and
   the second image information represents the print jobs as executed.

* * * * *